(12) United States Patent
Kolb et al.

(10) Patent No.: US 12,459,798 B2
(45) Date of Patent: Nov. 4, 2025

(54) DEVICE FOR VEHICLES FOR CARRYING OUT A STEERING MOVEMENT

(71) Applicant: GRAMMER Aktiengesellschaft, Ursensollen (DE)

(72) Inventors: Jens Kolb, Königstein (DE); Iman Bayani, Kümmersbruck (DE); Florian Schneider, Amberg (DE); Konstantin Krivenkov, Amberg (DE)

(73) Assignee: GRAMMER Aktiengesellschaft, Ursensollen (DE)

( * ) Notice: Subject to any disclaimer, the term of this patent is extended or adjusted under 35 U.S.C. 154(b) by 553 days.

(21) Appl. No.: 17/936,660

(22) Filed: Sep. 29, 2022

(65) Prior Publication Data

US 2023/0113631 A1  Apr. 13, 2023

(30) Foreign Application Priority Data

Sep. 30, 2021  (DE) ..................... 10 2021 125 464.7
Dec. 16, 2021  (DE) ..................... 10 2021 133 496.9

(51) Int. Cl.
*B66F 9/075* (2006.01)
*B62D 1/04* (2006.01)

(52) U.S. Cl.
CPC ............ *B66F 9/07568* (2013.01); *B62D 1/04* (2013.01); *B66F 9/0759* (2013.01)

(58) Field of Classification Search
CPC ...... B66F 9/07568; B66F 9/0759; B62D 1/04; B62D 1/02; G05G 1/62; G05G 1/10; B60N 2/797
See application file for complete search history.

(56) References Cited

U.S. PATENT DOCUMENTS

| 7,374,004 | B2 * | 5/2008 | Kraimer ................... | B60K 1/04 180/68.5 |
| 11,993,319 | B2 * | 5/2024 | McConoughey ...... | B60N 2/767 |
| 2005/0199436 | A1 * | 9/2005 | Schroder ............... | B62D 1/046 180/402 |

(Continued)

FOREIGN PATENT DOCUMENTS

| CN | 101676141 | 3/2010 |
| DE | 4403379 | 8/1994 |

(Continued)

OTHER PUBLICATIONS

Official Action with machine translation for German Patent Application No. 102021133496.9, dated Oct. 19, 2022, 15 pages.

(Continued)

*Primary Examiner* — Drew J Brown
(74) *Attorney, Agent, or Firm* — SHERIDAN ROSS P.C.

(57) ABSTRACT

Device for vehicles, in particular fork-lift trucks, the device being designed at least for carrying out a steering movement of the vehicle, the device being arranged on an arm rest of a vehicle seat of the vehicle, wherein the device is at least partially rotatable about a first pivot axis relative to the arm rest, wherein rotation of the device about the first pivot axis causes the steering movement of the vehicle, and wherein the device comprises a first device element arranged above the arm rest, and a second device element which is fixedly connected to the first device element and extends downwards from the first device element beyond the first device element.

20 Claims, 9 Drawing Sheets

(56) References Cited

U.S. PATENT DOCUMENTS

| | | | |
|---|---|---|---|
| 2006/0042857 A1* | 3/2006 | Catton | B60N 2/767 180/334 |
| 2006/0061122 A1 | 3/2006 | Billger et al. | |
| 2008/0066988 A1* | 3/2008 | Asp | B66F 9/0759 74/471 XY |
| 2010/0057307 A1 | 3/2010 | Copeland et al. | |
| 2012/0217083 A1* | 8/2012 | Brickner | B62D 12/00 180/443 |
| 2013/0046442 A1* | 2/2013 | Hayama | B66F 9/0755 701/42 |
| 2013/0158807 A1 | 6/2013 | Godwin et al. | |
| 2014/0379130 A1 | 12/2014 | Lee et al. | |
| 2019/0367341 A1* | 12/2019 | Stilwell | B66F 9/07572 |
| 2021/0284019 A1* | 9/2021 | Koshiol | E02F 9/16 |
| 2021/0371261 A1 | 12/2021 | Yasukochi | |

FOREIGN PATENT DOCUMENTS

| | | | |
|---|---|---|---|
| DE | 19809892 | | 9/1999 |
| DE | 19823528 A1 * | 10/1999 | B62D 1/18 |
| DE | 19951379 | | 5/2001 |
| DE | 19956870 | | 6/2001 |
| DE | 10218735 | | 10/2002 |
| DE | 60006520 | | 6/2004 |
| DE | 10351162 | | 6/2005 |
| DE | 102004052757 | | 5/2006 |
| DE | 102005019321 | | 11/2006 |
| DE | 102005047766 | | 4/2007 |
| DE | 102017211253 | | 1/2019 |
| DE | 102018205576 | | 10/2019 |
| DE | 102019101659 | | 7/2020 |
| DE | 102019213958 | | 3/2021 |
| EP | 1527980 | | 5/2005 |
| EP | 1959329 | | 8/2008 |
| JP | 2008120347 A * | 5/2008 | B62D 51/005 |
| KR | 20240096083 A * | 6/2024 | |
| SE | 512361 | | 3/2000 |

OTHER PUBLICATIONS

Official Action for U.S. Appl. No. 17/936,606, dated Sep. 26, 2024, 10 pages.
Notice of Allowance for U.S. Appl. No. 17/936,606, dated Dec. 18, 2024, 8 pages.
Corrected Notice of Allowance for U.S. Appl. No. 17/936,606, dated Dec. 20, 2024, 5 pages.
Official Action with machine translation for German Patent Application No. 102021133430.6, dated Jun. 14, 2022, 15 pages.
Official Action with machine translation for German Patent Application No. 102021133496.9, dated Jun. 14, 2022, 19 pages.
Official Action for German Patent Application No. 102021133496.9, dated Jul. 17, 2023, 14 pages.
Official Action for German Patent Application No. 102021133496.9, dated Feb. 26, 2023, 9 pages.
Extended European Search Report for European Patent Application No. 22197620.2, dated Jan. 27, 2023, 9 pages.
Extended European Search Report for European Patent Application No. 22197645.9, dated Jan. 27, 2023, 11 pages.
Official Action (with English translation) for India Patent Application No. 202224056175, dated Apr. 12, 2023, 5 pages.
Article 94(3) Communication for Europe Patent Application No. 22197645.9, dated Jul. 1, 2025, 6 pages.
Official Action (with English translation) for China Patent Application No. 2022112005439, dated May 9, 2025, 13 pages.
Article 94(3) Communication for Europe Patent Application No. 22197620.2, dated Jun. 24, 2025, 8 pages.

* cited by examiner

DEVICE FOR VEHICLES FOR CARRYING OUT A STEERING MOVEMENT

CROSS REFERENCE TO RELATED APPLICATION

This application claims the benefit of German Patent Application No. 10 2021 125 464.7, filed Sep. 30, 2021, and of German Patent Application No. 10 2021 133 496.9, filed Dec. 16, 2021, the contents of each of which are incorporated herein by reference in their entirety.

FIELD

The invention relates to a device for vehicles, in particular fork-lift trucks, the device being designed at least for carrying out a steering movement of the vehicle, the device being arranged on an arm rest of a vehicle seat of the vehicle, in accordance with the preamble of claim 1.

BACKGROUND

There is a wide variety of devices for performing a steering movement, also known as a steering device, also for forklift trucks. Up to now, normal steering wheels have usually been used, which are arranged in front of the vehicle seat and, due to their position, deprive the driver of a clear view of the goods to be transported on the forks of the forklift truck. In addition to the steering wheel, the dashboard is often located in the front area. If neither of these were present, the forklift truck driver would have no problem looking at the goods positioned low down or the freight positioned on the forks, thus ensuring safer driving and transport of the freight together with the pallet. Until now, this has often been associated with the fact that the driver has to rise from the vehicle seat or bend forward to ensure that the pallet or another object is picked up cleanly with the forks.

Steering devices are also known which are connected to the vehicle seat. However, these have a decisive ergonomic disadvantage when the driver turns backwards on the vehicle seat, for example when reversing, in order to be able to see the rear driving area.

Due to the body structure of the driver, if the body is twisted, the hand that is supposed to control the steering movement by means of the steering device tends to twist in relation to the device and the steering device can no longer be operated well and safely. For example, if the steering device is operated with the left hand, a clockwise rotation of the body is provided in order to be able to see the rear area. Accordingly, the driver's hand twists so that the hand shifts in relation to the device.

SUMMARY

Thus, it is the object of the invention to provide a device for carrying out a steering movement for vehicles which ensures both a free view of the driver of the vehicle of the area in front of the vehicle, in particular in the floor area of the vehicle, and a comfortable operation of a steering device of the vehicle independent of a momentary rotational position of the driver's body.

This task is solved by a device with the features of claim 1.

The core idea of the invention is that a device for vehicles, in particular fork-lift trucks, is provided, wherein the device is designed at least for carrying out a steering movement of the vehicle, wherein the device is arranged on an arm rest of a vehicle seat of the vehicle, and wherein the device can be rotated about a first pivot axis with respect to the arm rest, wherein a rotation of the device about the first pivot axis causes the steering movement, and wherein the device is designed at least for carrying out a steering movement of the vehicle, wherein the device comprises a first device element arranged above the arm rest, and a second device element fixedly connected to the first device element and extending downwardly from the first device element beyond the first device element.

This means that when the device is rotated about the pivot axis, both the first device element and the second device element are rotated about the pivot axis, as the device elements are firmly or rigidly connected to each other. Particularly preferably, the connection between the device elements is designed to be detachable, although it is also conceivable that the device elements are connected to each other in such a way that only damage to the device would cause the device elements to become detached.

Preferably, the device is arranged on a left arm rest, as a joystick is often provided on the right arm rest, which has various other functions, such as operating the forks of a forklift truck. It is also conceivable that the device is arranged on the right arm rest and the joystick is provided on the left arm rest.

According to the invention, the first device element is arranged above the arm rest. Particularly preferably, the arm rest has an upper surface so that the first device element is arranged above this upper surface.

Regardless of whether the device is arranged on the left arm rest or right arm rest, it is preferred that the second device element is arranged on an inner side of the arm rest, i.e. the side facing the driver.

According to a particularly preferred embodiment, it is provided that the first device element and the second device element are provided and designed such that the hand can be at least partially placed thereon, wherein during a forward movement of the vehicle the hand can be at least partially placed on the first device element and during a rearward movement of the vehicle the hand can be at least partially placed on the second device element.

The first device element comprises a first hand rest surface which can be at least partially covered by a palm and the fingers of the hand so that a sensitive left and right rotation of the device about the pivot axis results in a steering movement of the vehicle.

The second device element comprises a second hand rest surface which can be at least partially covered by a palm and the fingers of the hand so that sensitive left and right rotation of the device about the pivot axis results in steering movement of the vehicle.

Particularly preferably, the first hand rest surface is designed to extend in an extension direction of the arm rest, at least in a neutral position of the device, wherein preferably the second hand rest surface is designed to extend substantially perpendicularly or at an acute angle to the extension direction of the arm rest. The hand rest surfaces are preferably at least partially adapted to the shape and design of the hand.

According to a preferred embodiment, it is provided that the device can be rotated through a rotation angle of up to 40° to the left and to the right, more preferably up to 30° and further preferably up to 20°. Since the second device element extends downwards from the first device element over the second device element, i.e. into the area of the arm rest, the design of the angle of rotation of the device must be adapted accordingly, since otherwise the arm rest could impede the rotational movement of the device. Alternatively or cumulatively, the arm rest can be adapted accordingly to allow certain rotation angles.

Particularly preferred is a steering ratio of the angle of rotation of the device to a steering angle of the vehicle, such as the steering or the tyres. Further preferred is a progressive steering ratio, which means that the ratio of the angle of rotation to the steering angle changes disproportionately over the angle of rotation range.

The progressive design has, among other things, the advantage that relatively small angles of rotation result in small changes in the steering angle, so that the vehicle can be steered very precisely, for example, in order to be able to pick up a pallet with a fork of the forklift truck.

According to a preferred embodiment, the first pivot axis is arranged in a height direction or at an acute angle to the height direction. According to further embodiments, the first pivot axis can also be swivelled in any direction, i.e. forwards and sideways, in order to enable more comfortable operation depending on the hand position of the person in relation to their arm.

According to a preferred embodiment, the device can be height-adjustable in whole or in part relative to the arm rest, preferably in the direction of the first pivot axis, so that the device and the arm rest can be adjusted relative to the physical requirements of the driver.

According to a preferred embodiment, a resetting unit is provided which resets the device to a neutral position. The neutral position can, for example, be represented by a rotation angle of 0°.

For example, a return force can be applied to the rotated device by means of a corresponding return spring or the like, so that the device is automatically rotated to the neutral position when the hand or fingers are released or lifted off.

It is particularly preferable that the return unit, for example the return spring, is designed to be progressive, i.e. that a disproportionately greater counterforce or return force acts at larger angles of rotation.

According to a further preferred embodiment, it is provided that a haptic signal can be emitted when the device reaches the neutral position. Preferably, it can be provided that a haptic signal can be emitted when the device reaches the neutral position.

Acoustic signals or optical signals are also conceivable. Any combination is also conceivable.

The output of a corresponding signal that the device has reached the neutral position or that the device is in the neutral position can be particularly helpful for a driver when reversing if the device is not in the driver's field of vision.

Furthermore, the device can also be subjected to a damping force during rotation. This can be achieved by means of rotation dampers or the like, so that a not too abrupt and strong steering movement is possible within a short time.

According to a particularly preferred embodiment, it is provided that the rotary movement of the device can be acted upon with a counterforce. The counterforce is preferably such that the counterforce counteracts the resetting of the device, so that the resetting of the device does not occur too abruptly or even moves back and forth several times. The counterforce can preferably be linear or progressive over the angle of rotation.

Particularly preferably, a small counterforce is provided for small angles of rotation. Further preferably, the counterforce is adapted to the restoring force, which means, for example, that if high restoring forces act, a correspondingly higher counterforce is provided.

According to a further preferred embodiment, it is provided that first function keys and indicators are arranged on the first device element and second function keys and indicators are arranged on the second device element.

Here, the function keys and indicators can, for example, correspond to other vehicle functions such as light function, indicator function, parking function, horn function and the like.

Various other sensors and actuators in passive or active form could also be operated by correspondingly arranged switches on the device or their function could also only be indicated by indicator lights. It is also conceivable to change from forward to reverse driving by means of a small finger movement due to such actuating elements on the steering device. Furthermore, a change from fast to slow driving is conceivable. The battery status could also be displayed, as could the active ignition. In summary, it can be stated that a multitude of function keys and function displays can be arranged in such an innovative steering device, whereby all these further functions would be omitted as features of a dashboard, so that a dashboard as well as a steering wheel would be unnecessary. This also provides a clear view of the forks of a forklift truck and the ground area in front of a vehicle in general.

It is particularly preferred that at least one function of the function keys and indicators of the first device element and the second device element is the same and wherein further preferably the function keys and indicators of the first device element are only active during a forward movement and the function keys and indicators of the second device element are only active during a backward movement.

Preferably, a recognition unit is provided which is designed to recognise a forward movement and a backward movement. Preferably, the corresponding function keys and indicators are activated or deactivated by means of the recognition unit. In this way, unintentional actuation can be avoided.

The underlying object is also solved by a device for vehicles, in particular fork-lift trucks, the device being designed at least for carrying out a steering movement of the vehicle, the device being arranged on an arm rest of a vehicle seat of the vehicle, the device being rotatable about a first pivot axis with respect to the arm rest, a rotation of the device with a pivot angle about the first pivot axis causing the steering movement about a steering angle, the steering ratio being designed to be progressive from pivot angle to steering angle.

Particularly preferably, the steering ratio is designed to be progressive over the entire angle of rotation range.

The underlying object is also solved by a device for vehicles, the device being designed at least for carrying out a steering movement of the vehicle, the device being arranged on an arm rest of a vehicle seat of the vehicle, the device comprising at least one rotatable wheel element, which can be at least partially embraced on the circumferential side by fingers of a hand of the vehicle driver placed on the device and can be rotated about a first pivot axis for a steering movement, a second device element being fixedly connected to the wheel element and extending downwards from the wheel element beyond the wheel element.

In addition, the device is advantageously designed in such a way that it can be covered from above in its design, preferably knob-like, with an inner palm of a hand and the fingers pointing downwards enclose the wheel element so that a sensitive turning of the wheel to the left and right leads to a steering movement of the vehicle. The device therefore has a first hand rest surface, preferably the first hand rest surface being arranged at least partially or completely above the wheel element.

For this purpose, the fingers with or without the thumb of a left hand are arranged on the outer circumference of the wheel element and can freely rotate the wheel element by resting the hand. However, it should be noted that the palm of the hand is arranged on a stationary head part that does not move with the wheel element.

The wheel element, together with the knob-like head part and a base part arranged below it, fits ergonomically and comfortably to a curved palm and thus enables relaxed twisting of the wheel element and thus a sensitive steering process through slight movement of the fingers of this hand.

The wheel element that can be rotated around the pivot axis is preferably aligned horizontally, which means that the pivot axis is preferably aligned vertically. However, according to further embodiments, this axle can also be swivelled in any direction, i.e. forwards and sideways, in order to enable more comfortable operation depending on the hand position of the person in relation to their arm.

Above the edge element is the knob-like head part already mentioned, which is arranged stationary on the steering device and serves to rest the palm of the hand and forms the first hand rest surface. This head part has an ergonomically advantageous design so that it fits snugly into the palm of the hand. Preferably, it can also be height-adjustable so that the fingers projecting downwards are spaced from the wheel element in such a way that only the end regions of the fingers enclose the wheel element.

The head part can be height-adjustable as a whole or only in parts, so that, for example, an upper cover of the head part can be moved upwards, from which, among other things, active ventilation around the entire upper functional block or bonnet can result. This is because there would be a gap between the lid and the rest of the head part, which would also allow ventilation from the inside opposite the hand by supplying air internally. This air would flow downwards over the entire circumference of the head part, over the wheel element and the base part underneath, and thus also prevent any moist fingers from slipping off the wheel element.

The device itself, which is preferably arranged in the front area of the armrest, in front of a preferably structurally usual armrest, can also be advantageously varied in its distance to the rest of the armrest. As a result, a user can rest his arm on the arm rest in the usual way and this will distance the button-like head part together with the rest of the steering device from the arm rest in such a way that the steering device is optimally positioned in the palm of the hand at the correct distance from the rest of the forearm.

Below the wheel element is the aforementioned base part stationary opposite the arm rest, which is equipped with at least partially integrated first function keys and indicators. Such function keys and indicators can also be present in the knob-like head part as further function keys and indicators. Here, for example, further vehicle functions, such as light function, indicator function, parking function, horn function and the like. Various other sensors and actuators in passive or active form could also be operated by appropriately arranged switches on the head part or the base part, or their function could also only be indicated by indicator lights.

It is also conceivable to change from driving forwards to driving backwards by means of a small finger movement due to such actuating elements on the steering device. Furthermore, a change from fast to slow driving is conceivable. The battery status could also be displayed, as could the active ignition. In summary, it can be stated that a multitude of function keys and function displays can be arranged in such an innovative steering device, whereby all these further functions would be omitted as features of a dashboard, so that a dashboard as well as a steering wheel would be unnecessary. This also provides a clear view of the forks of a forklift truck and the ground area in front of a vehicle in general.

The wheel element is advantageously equipped with finger grooves on the circumference so that it is not possible for the fingertips or the end areas of the fingers, which grip the wheel from above, to slip off. Likewise, a more sensitive turning of the wheel is possible.

The head part, the base part and the wheel element are preferably at least partially circular in shape so as to provide an ergonomically comfortable shape for an inner side of a hand.

The steering device is arranged in front of the arm rest or on the arm rest as viewed in the direction of the vehicle seat and can be swivelled outwards by an angle relative to a longitudinal axis of the arm rest with respect to a seat surface of the vehicle seat. This corresponds to an ergonomically relaxed advantageous posture of the hand in relation to the rest of the forearm.

The head part and base part can be extended at the back towards the arm rest to provide better support for the palm of the hand. This means that in the rear area of the head and base part, these two parts are no longer circular or round, but have a bead-like extension, which is particularly comfortable for the palm of the user's hand due to the ergonomics of a palm rest.

According to the invention, the fixed connection between the wheel element and the second device element means that when the wheel element is rotated about the pivot axis, the second device element is also rotated about the pivot axis, since the wheel element and the second device element are fixed or rigidly connected to each other. Particularly preferably, the connection is designed to be detachable, although it is also conceivable that the connection is such that only damage to the device would lead to the device elements becoming detached.

According to the invention, the wheel element is arranged above the arm rest. Particularly preferably, the arm rest has an upper surface so that the wheel element is arranged above this upper surface.

Regardless of whether the device is arranged on the left arm rest or right arm rest, it is preferred that the second device element is arranged on an inner side of the arm rest, i.e. the side facing the driver.

The second device element comprises a second hand rest surface which can be at least partially covered by a palm and the fingers of the hand so that sensitive left and right rotation of the device about the pivot axis results in steering movement of the vehicle.

Preferably, the second hand rest surface is designed to extend substantially perpendicularly or at an acute angle to the direction in which the arm rest extends. The hand rest surfaces are preferably at least partially adapted to the shape and design of the hand.

According to a preferred embodiment, it is provided that the device is rotatable through an angle of rotation of up to 40° to the left and to the right, more preferably up to 30° and further preferably up to 20° or up to 15°. Since the second device element extends downwards from the wheel element over the wheel element, i.e. into or even beyond the area of the arm rest, the design of the angle of rotation of the device must be adapted accordingly, since otherwise the arm rest could impede the rotational movement of the wheel element. Alternatively or cumulatively, the arm rest can be adapted accordingly to allow certain rotation angles.

A steering ratio of the wheel element's angle of rotation to a steering angle of the vehicle, such as the steering or the tyres, is particularly preferred. The steering ratio is preferably progressive, i.e. the ratio of the angle of rotation to the steering angle changes disproportionately over the angle of rotation range.

The progressive design has, among other things, the advantage that relatively small angles of rotation result in small changes in the steering angle, so that the vehicle can be steered very precisely, for example, in order to be able to pick up a pallet with a fork of the forklift truck.

According to a preferred embodiment, the pivot axis is arranged in a height direction or at an acute angle to the height direction. According to further embodiments, the first pivot axis can also be swivelled in any direction, i.e. forwards and sideways, in order to enable more comfortable operation depending on the hand position of the person in relation to their arm.

According to a preferred embodiment, a resetting unit is provided which resets the device or the wheel element to a neutral position. The neutral position can, for example, be represented by a rotation angle of 0°.

For example, a return force can be applied to the rotated wheel element by means of a corresponding return spring or the like, so that the device is automatically rotated to the neutral position when the hand or fingers are released or lifted off.

It is particularly preferable that the return unit, for example the return spring, is designed to be progressive, i.e. that a disproportionately greater counterforce or return force acts at larger angles of rotation.

According to a further preferred embodiment, it is provided that a haptic signal can be emitted when the device or wheel element reaches the neutral position. Preferably, it can be provided that a haptic signal can be emitted when the device or the wheel element is in the neutral position.

Acoustic signals or optical signals are also conceivable. Any combination is also conceivable.

The output of a corresponding signal that the device or wheel element has reached the neutral position or is in the neutral position can be particularly helpful for a driver when reversing if the device is not in the driver's field of vision.

Furthermore, the device can also be subjected to a damping force during rotation. This can be achieved by means of rotation dampers or the like, so that a not too abrupt and strong steering movement is possible within a short time.

According to a particularly preferred embodiment, it is provided that the rotational movement of the wheel element can be acted upon with a counterforce. The counterforce is preferably such that the counterforce counteracts the resetting of the device or the wheel element, so that the resetting does not occur too abruptly or even moves back and forth several times. The counterforce can preferably be linear or progressive over the angle of rotation. Particularly preferably, a low counterforce is provided for small angles of rotation. Further preferably, the counterforce is adapted to the restoring force, which means, for example, that if high restoring forces act, a correspondingly higher counterforce is provided.

According to a further preferred embodiment, it is provided that further function keys and indicators are arranged on the second device element.

Here, the function keys and indicators can, for example, correspond to further vehicle functions, such as light function, indicator function, parking function, horn function and the like, as they are already arranged elsewhere. This makes it possible that these functions can be easily actuated when reversing, even though the hand is moving in relation to the device.

It is particularly preferred that at least one function of the function keys and indicators of the device without second device element and of the second device element are the same and wherein further preferably the function keys and indicators of the device are only active during a forward movement and the function keys and indicators of the second device element are only active during a backward movement.

Preferably, a recognition unit is provided which is designed to recognise a forward movement and a backward movement. Preferably, the corresponding function keys and indicators are activated or deactivated by means of the recognition unit. In this way, unintentional actuation can be avoided.

The underlying object is further solved by a device for vehicles, the device being designed at least for carrying out a steering movement of the vehicle, the device being arranged on an arm rest of a vehicle seat of the vehicle, wherein the device comprises a first device element arranged above the arm rest, and
a second device element fixedly connected to the first device element and extending downwardly from the first device element beyond the first device element, wherein the device is arranged substantially rigidly with respect to the arm rest and a steering movement of the vehicle can be caused by means of a force action and/or a torque action on the device.

"Essentially" is to be understood as meaning that no or only a very slight rotation of the device is provided. The maximum rotation does not exceed 10°, more preferably 5°, to the left and to the right, even more preferably the maximum rotation is at most 3° in each direction of rotation.

According to this embodiment, a steering movement of the vehicle can be caused as a function of the force action and/or the torque action on the device. According to a preferred embodiment, it is provided that each value of the force action and/or torque action is associated with a steering angle of the vehicle. Particularly preferably, the dependence between the force effect and/or the torque effect and the steering angle is linear or progressive. Preferably, the higher the value of the force action and/or torque action on the device, the greater the steering angle of the vehicle. The dependence between the force effect and/or the torque effect and the steering angle can be stored as desired and implemented accordingly by means of a control unit or stored anew as desired. By measuring the forces or torques, spring elements, provisions, damping or the like can be dispensed with, since the dependency can be described electronically and no movement in the larger sense of the device is provided.

According to a further preferred embodiment, it is provided that at least one sensor is provided by means of which the force effect and/or torque effect can be measured. It is particularly preferred that sensor data of the sensor are transferred to a control unit, by means of which a corresponding control of the steering and the adjustment of the steering angle is caused, preferably by means of corresponding control elements, actuators or the like.

According to a further preferred embodiment, it is provided that an elastic element, preferably an elastically deformable element, is arranged between the device and the arm rest. The elastic element can consist of a natural rubber, a rubber, an elastomer or other elastic or elastically deformable materials. Because the connection between the device and the arm rest is formed by an elastic element, a slight rotation of the device relative to the arm rest can be realised. Further preferably, rotational forces or torques can be absorbed which occur due to the action of force and/or torque on the device, in order to be able to prevent damage to the device. This corresponds to the basic idea of an essentially rigid connection between the device and the arm rest.

Particularly preferably, it can be provided that a sensor unit is provided and designed to detect a hand. The sensor unit detects whether the hand is in contact with the first hand rest surface or the second hand rest surface or whether the hand is placed on the first device element or the second device element. Preferably, the sensor unit comprises a corresponding first sensor arranged in or on the first device element or the hand rest surface, and a second sensor arranged in or on the second device element or the hand rest surface.

Further embodiments and embodiments among the embodiments are applicable to the further embodiments and can be freely combined among each other, provided that they do not correspond to contrary embodiments.

Further advantageous embodiments result from the subclaims.

BRIEF DESCRIPTION OF THE DRAWINGS

Further aims, advantages and usefulness of the present invention will be found in the following description in conjunction with the drawings. Hereby show.

DETAILED DESCRIPTION

In the figures, identical components are to be understood with the corresponding reference signs. For the sake of clarity, some components may not have a reference sign in some figures, but have been designated elsewhere.

Figure 1A:
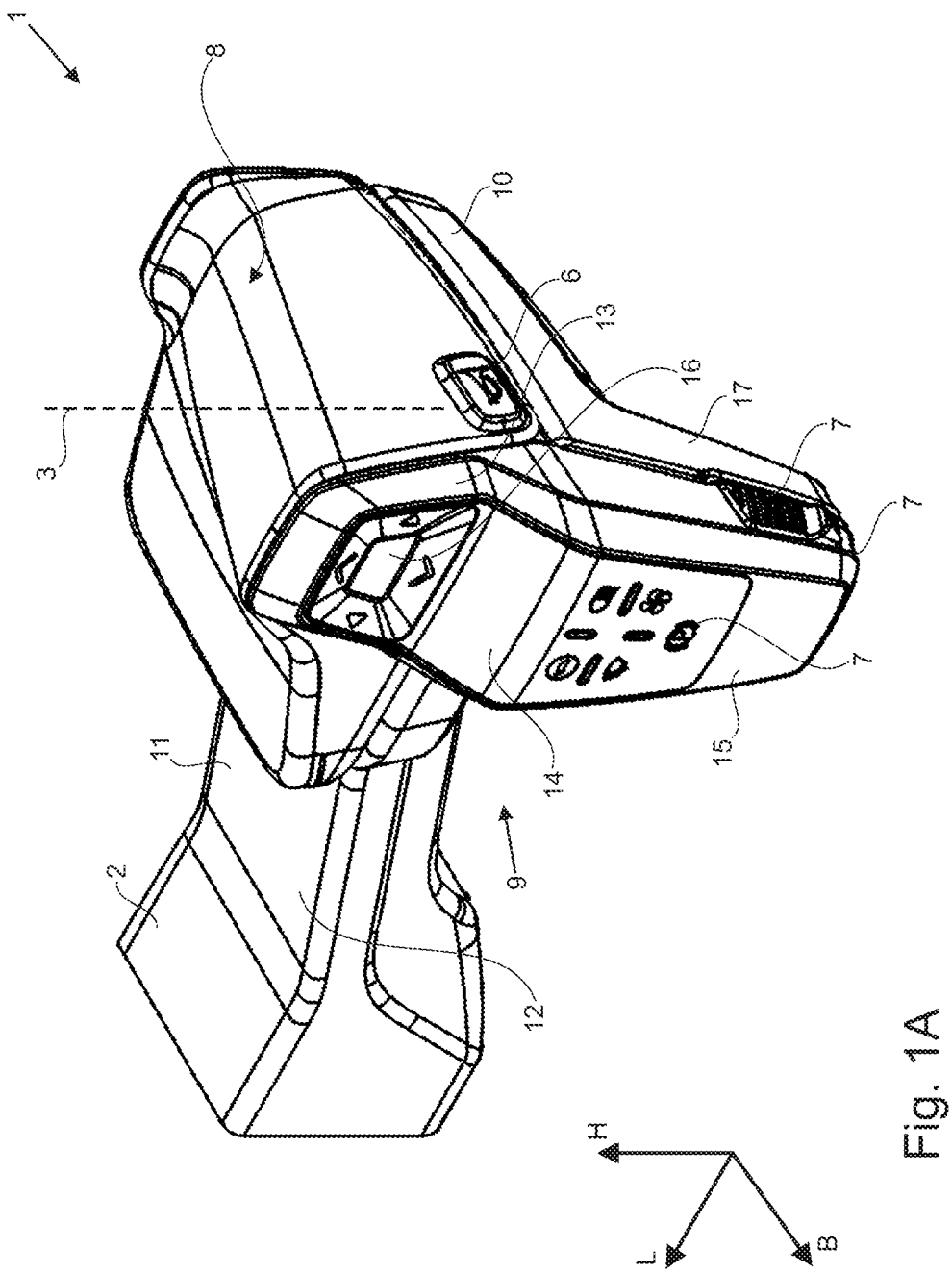
FIG. 1A a device according to a preferred embodiment.

FIG. 1A shows a device 1 for performing a steering movement of a vehicle (not shown here), wherein the device is arranged on an arm rest 2 of a vehicle seat (not shown in more detail here). Arranged on an arm rest 2 can mean that the device 1 is arranged directly on the arm rest 2 or, as shown, is arranged with the arm rest 2 by means of an arm rest extension 11, the arm rest extension 11 preferably being translationally displaceable relative to the arm rest 2, for example in a longitudinal direction L or at an angle to the longitudinal direction L. Particularly preferably, it is conceivable that the arm rest extension 11 is translationally displaceable relative to the arm rest 2 and rotatable relative to the arm rest 2. The translatory adjustability makes it possible to adapt the device 1 according to the driver's arm.

Further, the device 1 is rotatable about a first pivot axis 3 relative to the arm rest 2 or the arm rest extension 11.

The device 1 thereby comprises a first device element 4 and a second device element 5, wherein the second device element 5 is arranged fixedly connected to the first device element 4 and extends downwards from the first device element 4 beyond the first device element 4, in particular as seen in a height direction H.

Furthermore, the first device element 4 has a first hand rest surface 8 and the second device element 5 has a second hand rest surface 9. Preferably, the first hand rest surface 8 extends in the longitudinal direction L and the second hand rest surface 9 extends in the height direction H.

In the present embodiment according to FIG. 1, the first device element 4 is arranged above a surface 12 of the arm rest 2 or the arm rest extension 11, viewed in the height direction H. The second device element 5 extends from the first device element 4 downwards, particularly preferably to below the surface 12. Particularly preferably, the second device element 5 extends downwards from the first device element 4 over the surface 12, particularly preferably to below the arm rest 2 or the arm rest extension 11. When the driver turns backwards, the driver's hand turns accordingly, so that in particular the fingers of the hand slide down from the first hand rest surface 8 and the hand moves onto the second hand rest surface 9 due to the arrangement of the device elements 4, 5 relative to each other. Rotation of the device 1 is therefore possible by applying force to the second device element 5.

Particularly preferably, the second device element 5 is designed in such a way that a hand can be laid down easily, i.e. it is adapted to the physiology of the hand.

Preferably, the second device element 5 comprises a first area 13, a second area 14 and a third area 15, wherein the first area 13 is connected to the first device element 4. Further preferably, the third region 15 is spaced from the first region 13 as viewed in a width direction B, so that this third region 15 is higher in the width direction B. Between the first area 13 and the third area 15, the second area 14 is arranged, which is intended to connect the first area 13 and the third area 15 to each other.

The extension of the second device element 5 in height direction H as well as in longitudinal direction L are preferably adapted to the hand geometry.

According to a preferred embodiment, the second area 15 comprises a recess 16 or a recessed area 16, respectively, which is intended for a thumb of the hand to rest on, so that there is a good connection of the thumb to the device 1, in particular when the hand rests on the first hand rest surface 8. FIG. 1 shows a left arm rest so that the thumb of the left hand comes to rest in the recess 16.

The second device element 5 therefore has at least a dual function, namely a forward driving position as well as a rearward driving position.

Further preferably, a device support element 10 is provided which is rigidly connected to the arm rest 2 or to the arm rest extension 11. Particularly preferably, the first device element 4 is arranged above the device support element 10. Further preferably, it can be provided that an extension 17 of the device support element 10, which is rigid in itself, is provided, which extends downwards and is at least partially complementary to the second device element 5. In this way, unwanted force effects on the second device element 5 can be reduced, for example through movements of a thigh against the second device element 5, which could result in steering movements.

Figure 1B:
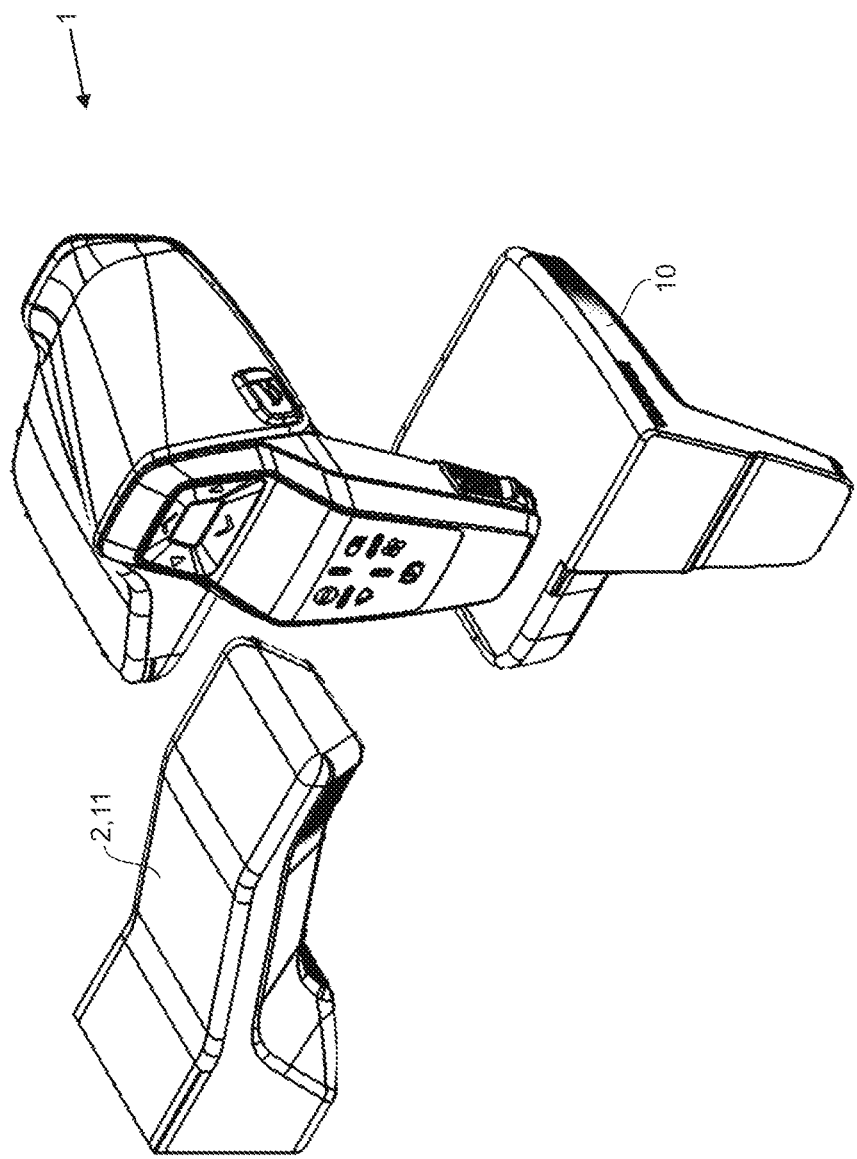
FIG. 1B the device according to FIG. 1A in a partial exploded view.
Figure 1C:
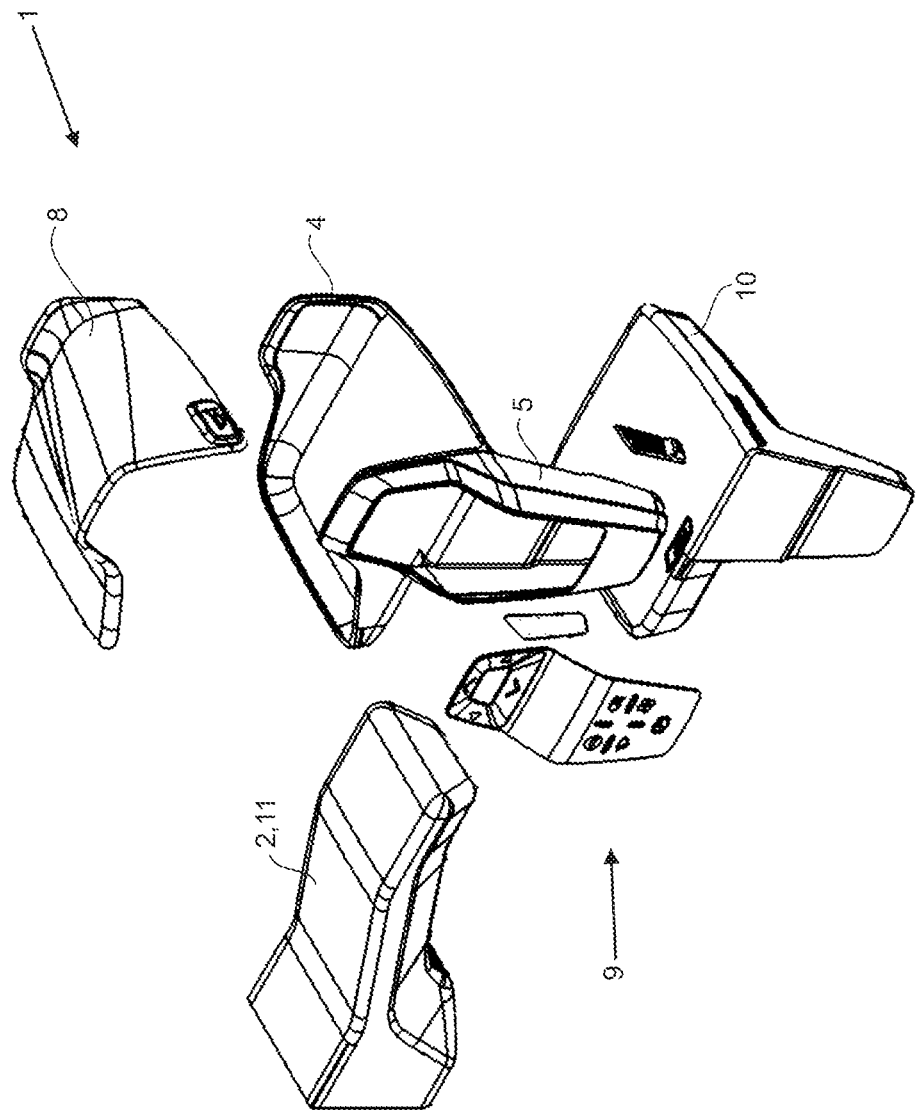
FIG. 1C the device according to FIG. 1A in a complete exploded view.

The device support element 10 is shown again in FIG. 1B, whereby the device support element 10 is already mounted.

Preferably, the device support element 10 is designed in such a way that the device 1 can be rotatably connected to the device support element 10.

The first device element 4 has first function keys and indicators 6 and the second device element has second function keys and indicators 7.

It is particularly preferred that during a forward movement the first function keys and indicators 6 are activated and the second function keys and indicators 7 are deactivated and during a backward movement the first function keys and indicators 6 are deactivated and the second function keys and indicators 7 are activated. This makes it possible for unintentional actuations of function keys and indicators of the device elements 4, 5 not occupied by the hand. Particularly preferably, the assignments of the first function keys and indicators 6 are at least partially the same as the assignments of the second function keys and indicators 7. In particular, such assignments with functions that are necessary or intended for both forward and backward movement, such as a horn function or the like.

Particularly preferably, a recognition unit is provided which is intended to recognise the forward movement and a backward movement. Preferably, the corresponding function keys and indicators 6, 7 are activated or deactivated by means of the recognition unit. In this way, unintentional actuation can be avoided.

Alternatively, it is also conceivable that all function keys and indicators 6, 7 are activated.

It is particularly preferred that the rotary movement of the device 1 is subject to a torque which counteracts the rotary movement. This depends on the fact that on the one hand the device 1 is rotated with the thumb or other fingers, whereby more force can be applied by means of the thumb. Therefore, when the device 1 is rotated with the thumb, a higher torque can be provided than when the device 1 is rotated with other fingers.

FIG. 1C shows the device 1 again in a complete exploded view. It can be seen that the device is largely hollow. The first device element 4 and the second device element 5 are formed as hollow bodies, whereby the device elements 4, 5 are rigidly connected to one another, for example, they are moulded onto one another or are moulded as one part. The respective hand rest surfaces 8, 9 can be designed as separate elements which can be connected to the respective device element 4, 5, for example clipped on or the like, so that easy interchangeability can be ensured.

Figure 1D:
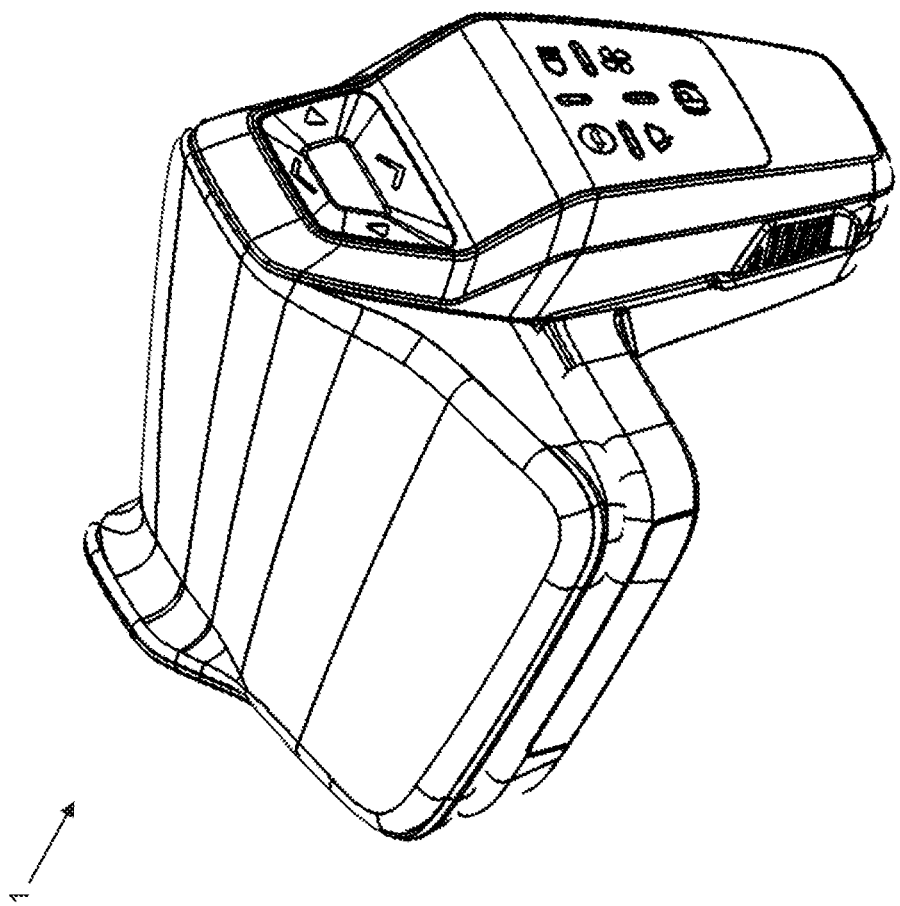
FIG. 1D the device on a right arm rest.

In FIG. 1D, the device 1 is shown for a right arm rest 2 so that the position of the second device element 5 is different from the first device element 4 to face the person sitting on the vehicle seat.

Figure 2A:
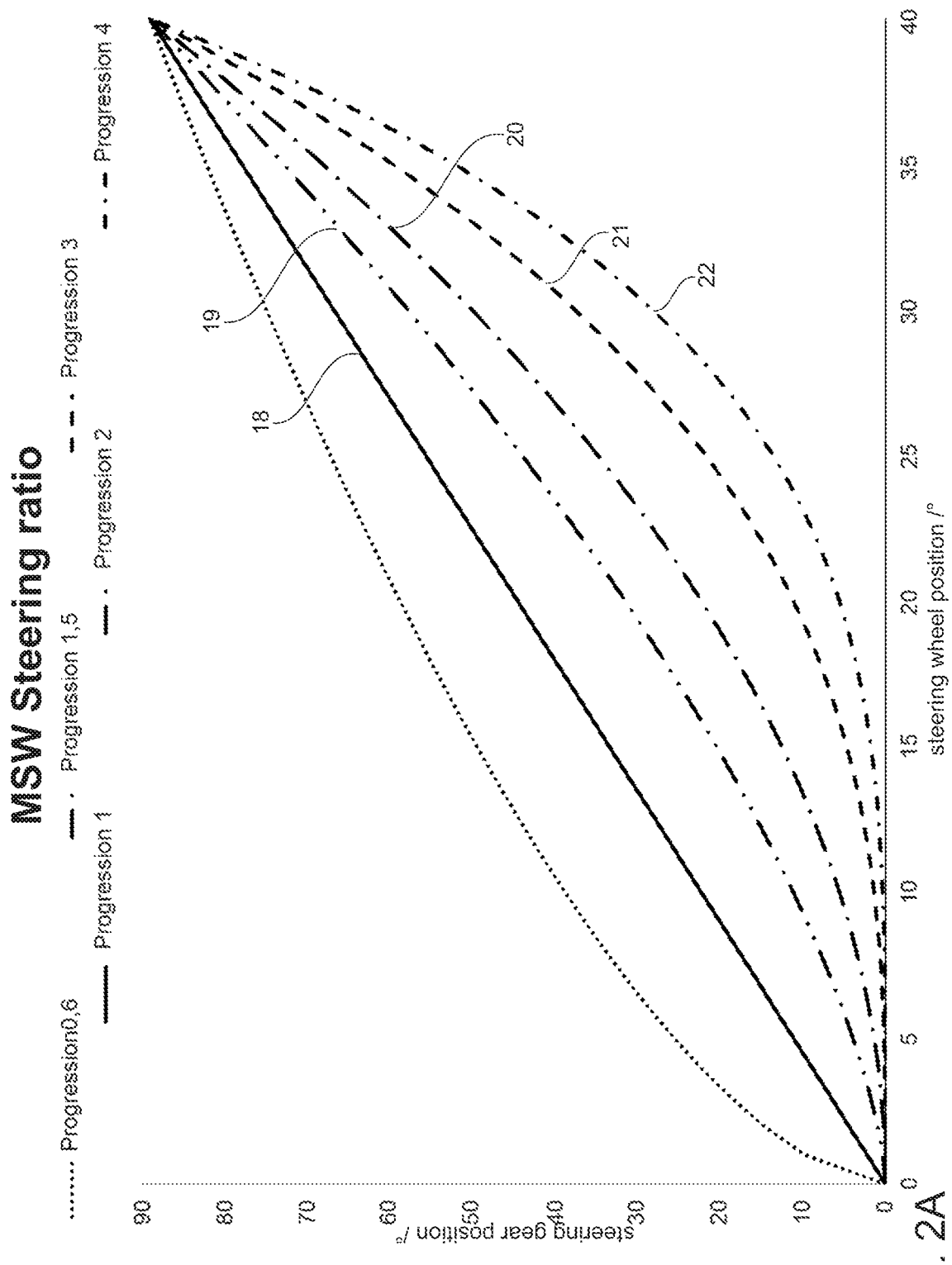
FIG. 2A a progressive steering ratio of the device.

FIG. 2A shows different interpretations of the progressive steering ratio, i.e. a function of the angle of rotation to the steering angle. The abscissa shows the angle of rotation of the device 1 and the ordinate shows the steering angle.

A linear progression 18 is shown with a first curve for comparison. With the further progressions, progressive progressions 19, 20, 21, 22 are shown, whereby the first progressive progression 19 has a weaker progression than the second progressive progression 20, which has a weaker progression than the third progressive progression 21, which has a weaker progression than the fourth progressive progression 22.

It would be conceivable that the respective function is described by a corresponding power function, preferably with even exponents.

Figure 2B:
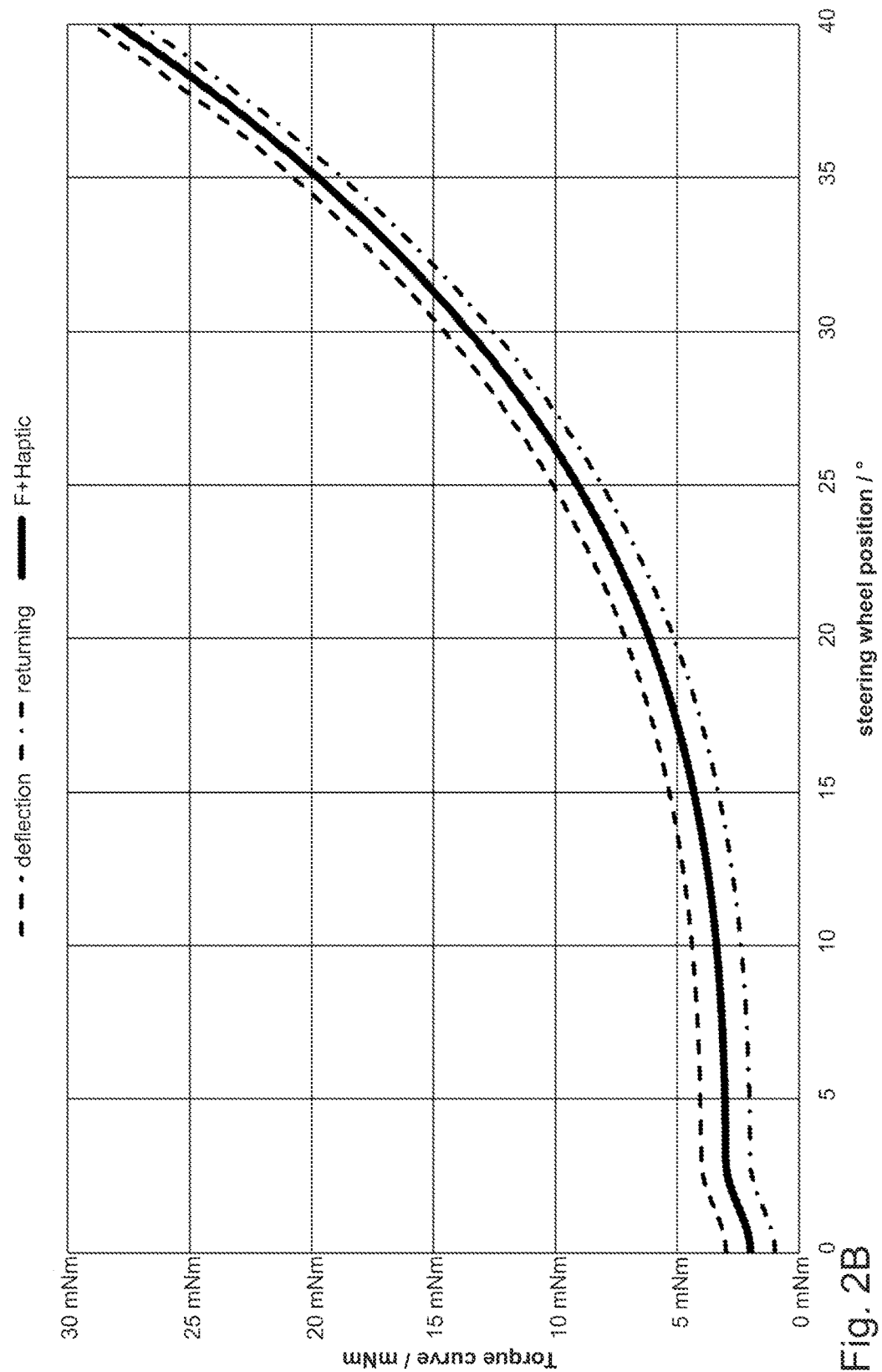
FIG. 2B Depiction of a restoring force of the device.

FIG. 2B shows an exemplary progression of a restoring force.

Figure 3:
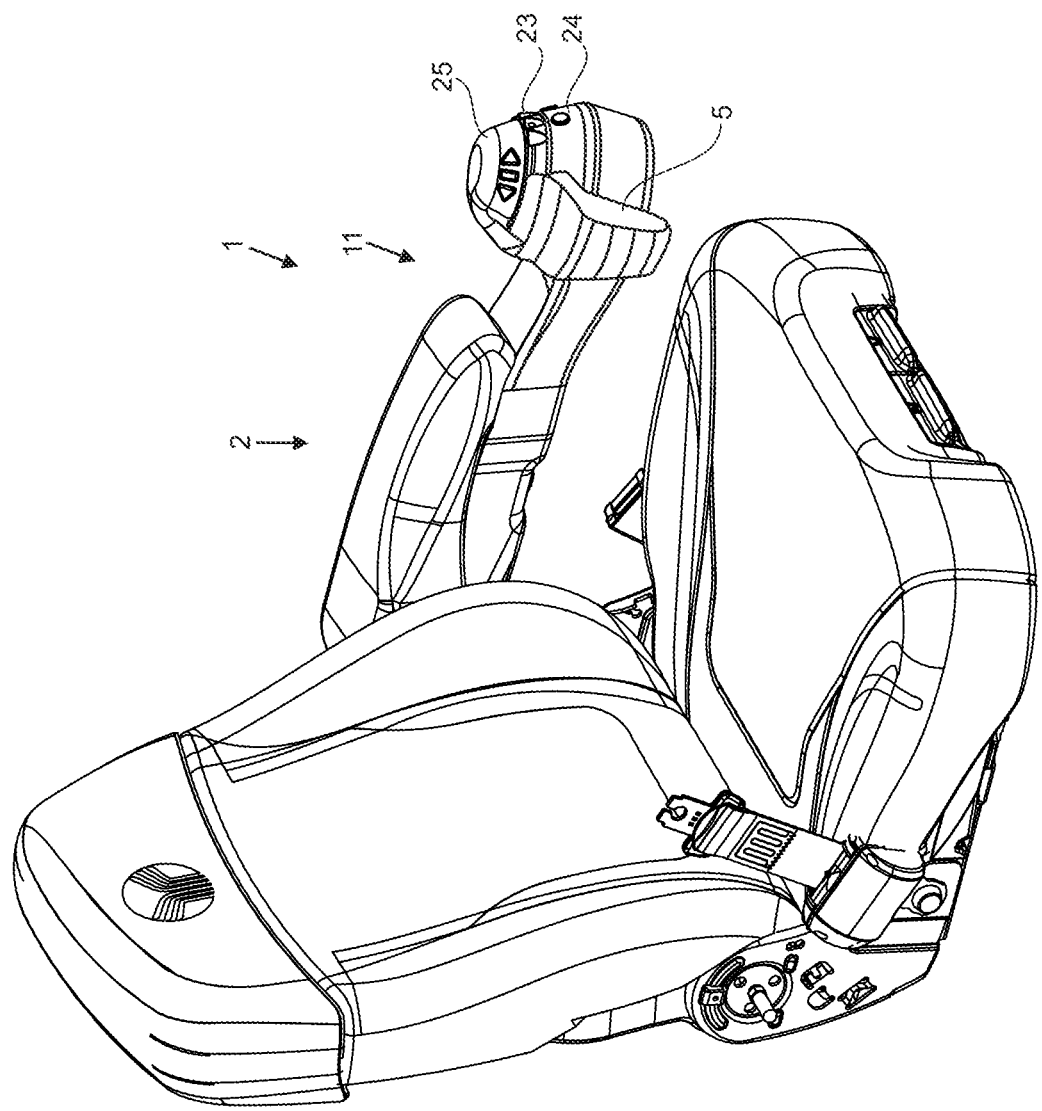
FIG. 3 Device according to an alternative design.

FIG. 3 shows a device 1 according to an alternative embodiment. FIG. 3 shows a perspective view of a vehicle seat with the device 1 according to the invention. The vehicle seat has a backrest and a seat part. An arm rest 2 is arranged on the left side and has a device 1 according to the invention attached to it in its front area. The device 1 comprises a rotatable wheel element 23, a base part 24 and a head part 25, wherein the wheel element 23 is arranged above the base part 24 and below the head part 25.

Furthermore, the second device element 5 is provided on the wheel element 23.

The device 1 is attached to the arm rest 2 with an arm-like component or the arm rest extension 11 in front of and below the arm rest 2.

Figure 4:
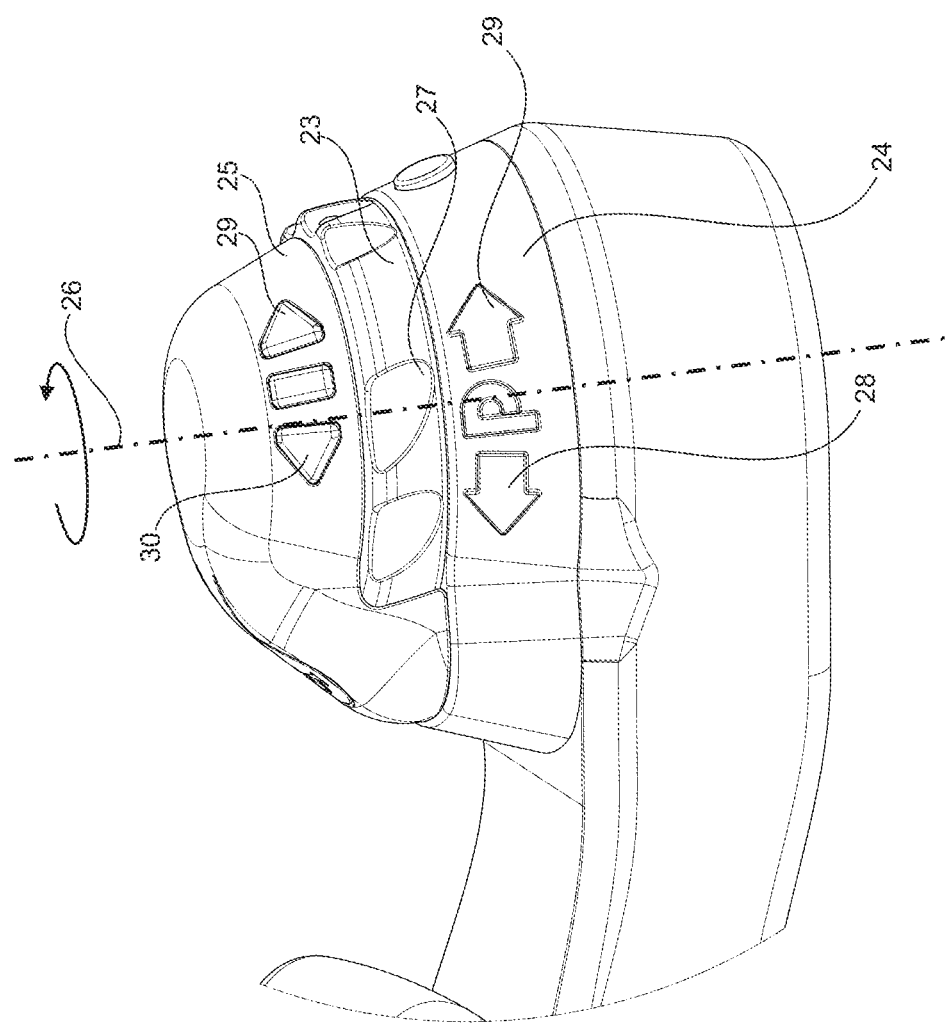
FIG. 4 Device according to FIG. 3 in a side view.

FIG. 4 shows a side view of the device of FIG. 3 without the additional arm rest and without the second device element 5. It can be seen from this illustration that the device 1 not only comprises the wheel element 9, which can be rotated about the axle 26, with finger notches 27 arranged on it, in which the fingers can be comfortably placed in order to rotate the wheel element 23. In fact, the stationary base part 24 with additional function buttons or function displays 28, 29 can also be seen arranged underneath. The control switches 28, 29 can, for example, be operated with the thumb of the left hand to assume a parking position or to activate or deactivate a parking brake. It is not necessary to remove the remaining fingers of the left hand from the wheel element 23 for this.

The head part 10 also has function indicators and function actuators. For example, an indicator of the vehicle can be operated by actuating elements 29, 30. However, these actuating elements can also be used to move the vehicle forwards and backwards.

Figure 5:
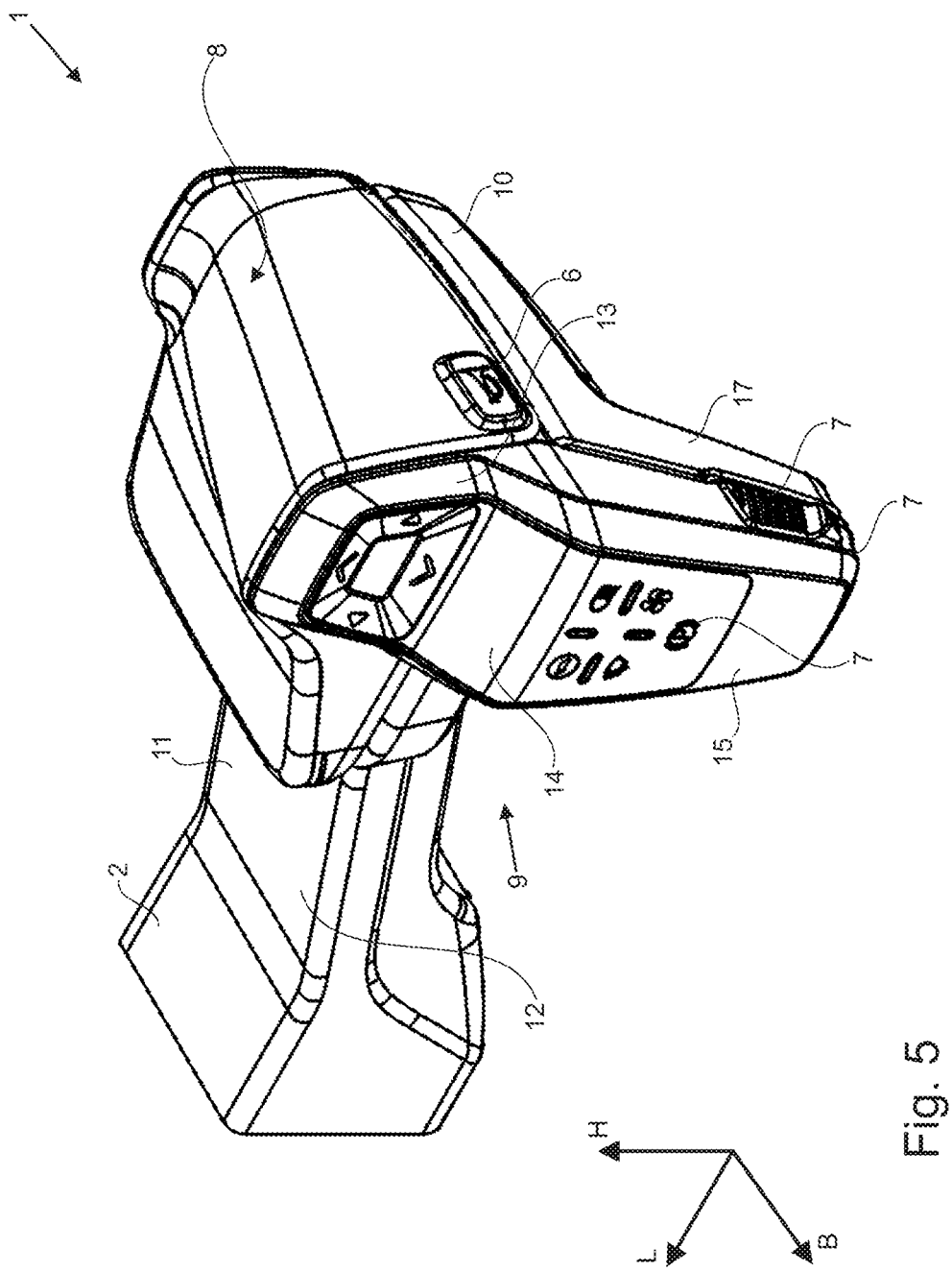
FIG. 5 Device according to a further alternative design.

FIG. 5 shows another alternative embodiment which essentially corresponds to the embodiment according to FIG. 1, whereby the device 1 is essentially rigidly arranged relative to the arm rest 2, i.e. no or only a very slight rotation of the device 1 is possible. Furthermore, a sensor (not shown here) is provided which is intended and designed to detect the effects of force and/or torque on the device 1. This sensor data can be used by means of a control unit (not shown here) to adjust corresponding steering angles of the vehicle, for example by actuators, actuating elements or the like.

The applicant reserves the right to claim all features disclosed in the application documents as essential to the invention, provided they are individually or in combination new compared to the prior art. It is further pointed out that the individual figures also describe features which may be advantageous in themselves. The skilled person immediately recognises that a certain feature described in a figure can also be advantageous without adopting further features from this figure. Furthermore, the skilled person recognises that advantages can also result from a combination of several features shown in individual figures or in different figures.

LIST OF REFERENCE SIGNS

1 Device
2 Armrest
3 pivot axis
4 first device element
5 second device element
6 first function keys and indicators
7 second function keys and indicators
8 First hand rest surface
9 Second hand rest surface
10 Device support element 11 Arm rest extension
12 Surface
13 first area of second device element
14 second area of second device element
15 Third area of second device element
16 recess, recessed area
17 extension
18 linear progression
19 First progressive progression
20 Second progressive progression
21 Third progressive progression
22 fourth progressive progression
23 Wheel element
24 Base part
25 head part
26 Axis
27 Finger notch
28 Operator switch
29 Operator switch
30 Operator switch

What is claimed is:

1. A device for vehicles, in particular fork-lift trucks, the device being designed at least for carrying out a steering movement of a vehicle, the device being arranged on an arm rest of a vehicle seat of the vehicle, wherein the device is at least partially rotatable about a first pivot axis relative to the arm rest, wherein rotation of the device about the first pivot axis causes the steering movement of the vehicle, wherein the device comprises:
    a first device element arranged above the arm rest, and
    a second device element which is fixedly connected to the first device element and extends downwards from the first device element beyond the first device element, and wherein the device comprises at least one rotatable wheel element which can be at least partially embraced on a circumferential side by fingers of a hand of a vehicle driver placed on the device and can be rotated about an axle for the steering movement, the second device element being fixedly connected to the wheel element and extending downwards from the wheel element beyond the wheel element.

2. The device according to claim 1, wherein the first device element and the second device element are provided and designed such that the hand can be at least partially placed thereon, wherein during a forward movement of the vehicle the hand can be at least partially placed on the first device element and during a rearward movement of the vehicle the hand can be at least partially placed on the second device element.

3. The device according to claim 1, wherein the first pivot axis is arranged extending in a height direction of the device or at an acute angle to the height direction.

4. The device according to claim 1, wherein a steering ratio from a rotation angle of the device to a steering angle is progressive.

5. The device according to claim 1, wherein a resetting unit is provided which resets the device to a neutral position.

6. The device according to claim 5, wherein a haptic signal is emitted when the device is in the neutral position.

7. The device according to claim 1, wherein a rotary movement of the device can be subjected to a proportional counterforce, such that a greater rotary movement experiences a greater counterforce.

8. The device according to claim 1, wherein first function keys and indicators are arranged on the first device element and second function keys and indicators are arranged on the second device element.

9. A device for vehicles, the device being designed at least for carrying out a steering movement of a vehicle, the device being arranged on an arm rest of a vehicle seat of the vehicle, wherein the device has:
    a first device element arranged above the arm rest, and
    a second device element fixedly connected to the first device element and extending downwardly from the first device element beyond the first device element,
    wherein the device is arranged substantially rigidly relative to the arm rest and the steering movement of the vehicle is caused by means of a force action and/or a torque action on the device, and wherein the device comprises at least one rotatable wheel element that is at least partially embraceable on a circumferential side by fingers of a hand of a vehicle driver placed on the device and rotatable about an axle for a steering movement, the second device element being fixedly connected to the wheel element and extending downwards from the wheel element beyond the wheel element.

10. The device according to claim 9, wherein each value of an application of force and/or torque is associated with a steering angle of the vehicle.

11. The device according to claim 9, wherein a sensor is provided by means of which the force action and/or torque action can be measured.

12. The device according to claim 9, wherein an elastic element is disposed between the device and the arm rest.

13. A device for vehicles, in particular fork-lift trucks, the device being designed at least for carrying out a steering movement of a vehicle, the device being arranged on an arm rest of a vehicle seat of the vehicle, wherein the device is rotatable about a first pivot axis relative to the arm rest, wherein rotation of the device at a pivot angle about the first pivot axis causes steering movement through a steering angle, a steering ratio being progressive from pivot angle to steering angle, wherein the device comprises:
    a first device element arranged above the arm rest,
    a second device element fixedly connected to the first device element, and
    at least one rotatable wheel element that is at least partially embraceable on a circumferential side by fingers of a hand of a vehicle driver placed on the device and that can be rotated about an axle for the steering movement, wherein the second device element is fixedly connected to the wheel element and extends downwards from the wheel element beyond the wheel element.

14. The device according to claim 13, wherein the second device element extends downwards from the first device element beyond the first device element.

15. The device according to claim 13, further comprising a resetting unit that resets the device to a neutral position.

16. The device according to claim 15, wherein the device emits a haptic signal when in the neutral position.

17. The device according to claim 13, wherein the first device element comprises first function keys and indicators, and wherein the second device element comprises second function keys and indicators.

18. The device according to claim 13, further comprising a sensor configured to measure at least one of a force action and a torque action on the device.

19. The device according to claim 13, wherein the first pivot axis extends in a height direction of the device or at an acute angle to the height direction.

20. The device according to claim 13, wherein an elastic element is disposed between the device and the arm rest.

\* \* \* \* \*